United States Patent
Potnis et al.

(10) Patent No.: US 10,795,786 B1
(45) Date of Patent: *Oct. 6, 2020

(54) DISASTER RECOVERY FOR SOFTWARE DEFINED NETWORK ATTACHED STORAGE USING STORAGE ARRAY SYNCHRONOUS DATA REPLICATION

(71) Applicant: EMC IP HOLDING COMPANY LLC, Hopkinton, MA (US)

(72) Inventors: Ajay Potnis, Pune (IN); Adnan Sahin, Needham, MA (US); Shampavman Chenjeri Gururajarao, Bangalore (IN); Bharadwaj Sathavalli, Bangalore (IN); Maneesh Singhal, Bangalore (IN); Amit Dharmadhikari, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/176,089

(22) Filed: Oct. 31, 2018

(51) Int. Cl.
*G06F 11/20* (2006.01)
*G06F 9/455* (2018.01)
*G06F 16/178* (2019.01)
*G06F 16/188* (2019.01)

(52) U.S. Cl.
CPC ...... *G06F 11/2069* (2013.01); *G06F 9/45508* (2013.01); *G06F 16/178* (2019.01); *G06F 16/188* (2019.01); *G06F 2201/80* (2013.01); *G06F 2201/805* (2013.01); *G06F 2201/815* (2013.01); *G06F 2201/82* (2013.01)

(58) Field of Classification Search
CPC ..... G06F 11/20; G06F 11/2069; G06F 11/206
USPC ........................................................ 714/6.23
See application file for complete search history.

(56) References Cited

U.S. PATENT DOCUMENTS

| | | | | |
|---|---|---|---|---|
| 7,669,080 B2* | 2/2010 | Lind | ............... | G06F 11/2097 714/11 |
| 7,702,953 B2* | 4/2010 | Spear | ............... | G06F 11/2058 714/5.11 |
| 7,770,058 B2* | 8/2010 | Phan | ............... | G06F 11/2025 714/6.12 |
| 8,522,068 B2* | 8/2013 | Akirav | ............... | G06F 11/1456 714/4.11 |
| 8,671,308 B2* | 3/2014 | Akirav | ............... | G06F 11/1456 714/4.11 |
| 8,850,139 B2* | 9/2014 | Akirav | ............... | G06F 3/0619 711/111 |
| 9,448,900 B2* | 9/2016 | Gordon | ............... | G06F 11/1662 |
| 10,387,273 B2* | 8/2019 | Maheshwar | ............... | G06F 11/1471 |
| 2005/0193245 A1* | 9/2005 | Hayden | ............... | G06F 11/2069 714/13 |

(Continued)

*Primary Examiner* — Kamini B Patel
(74) *Attorney, Agent, or Firm* — Anderson Gorecki LLP (57) ABSTRACT

Disaster recovery is provided for Software Defined Network Attached Storage where the data backup is implemented synchronous data replication. A synchronous replication remote data facility is created between a primary storage array and a backup storage array. User filesystems being handled by a virtual data mover (VDM) and a configuration filesystem describing the location of the user filesystems on the primary storage array are replicated on the remote data facility to the backup storage array. Individual filesystems, individual VDMs, or groups of VDMs may be selectively failed over from the primary storage array to the backup storage array.

11 Claims, 9 Drawing Sheets

(56) References Cited

U.S. PATENT DOCUMENTS

| | | | |
|---|---|---|---|
| 2007/0079171 A1* | 4/2007 | Aidun | G06F 11/2074 |
| | | | 714/6.1 |
| 2015/0172111 A1* | 6/2015 | Lalsangi | H04L 67/42 |
| | | | 709/220 |
| 2016/0050282 A1* | 2/2016 | Olson | H04L 67/1095 |
| | | | 709/201 |
| 2017/0185497 A1* | 6/2017 | Luo | G06F 11/2069 |
| 2017/0242599 A1* | 8/2017 | Patnaik | G06F 3/067 |
| 2018/0081931 A1* | 3/2018 | Quakkelaar | G06F 11/14 |
| 2018/0095851 A1* | 4/2018 | Zhang | G06F 11/2094 |
| 2018/0352037 A1* | 12/2018 | Shang | H04L 67/148 |

\* cited by examiner

DISASTER RECOVERY FOR SOFTWARE DEFINED NETWORK ATTACHED STORAGE USING STORAGE ARRAY SYNCHRONOUS DATA REPLICATION

BACKGROUND

This disclosure relates to computing systems and related devices and methods, and, more particularly, to disaster recovery for Software Defined Network Attached Storage (SDNAS) using storage array synchronous data replication.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

Disaster recovery is provided for Software Defined Network Attached Storage where the data backup is implemented using synchronous data replication. A synchronous replication remote data facility is created between a primary storage array and a backup storage array. User filesystems being handled by a virtual data mover (VDM) and a configuration filesystem describing the location of the user filesystems on the primary storage array are replicated on the remote data facility to the backup storage array. Individual filesystems, individual VDMs, or groups of VDMs may be selectively failed over from the primary storage array to the backup storage array.

DETAILED DESCRIPTION

This disclosure is based, at least in part, on the realization that it would be advantageous to enable disaster recovery for Software Defined Network Attached Storage (SDNAS) using synchronous data replication facilities of the underlying storage arrays.

Figure 1:
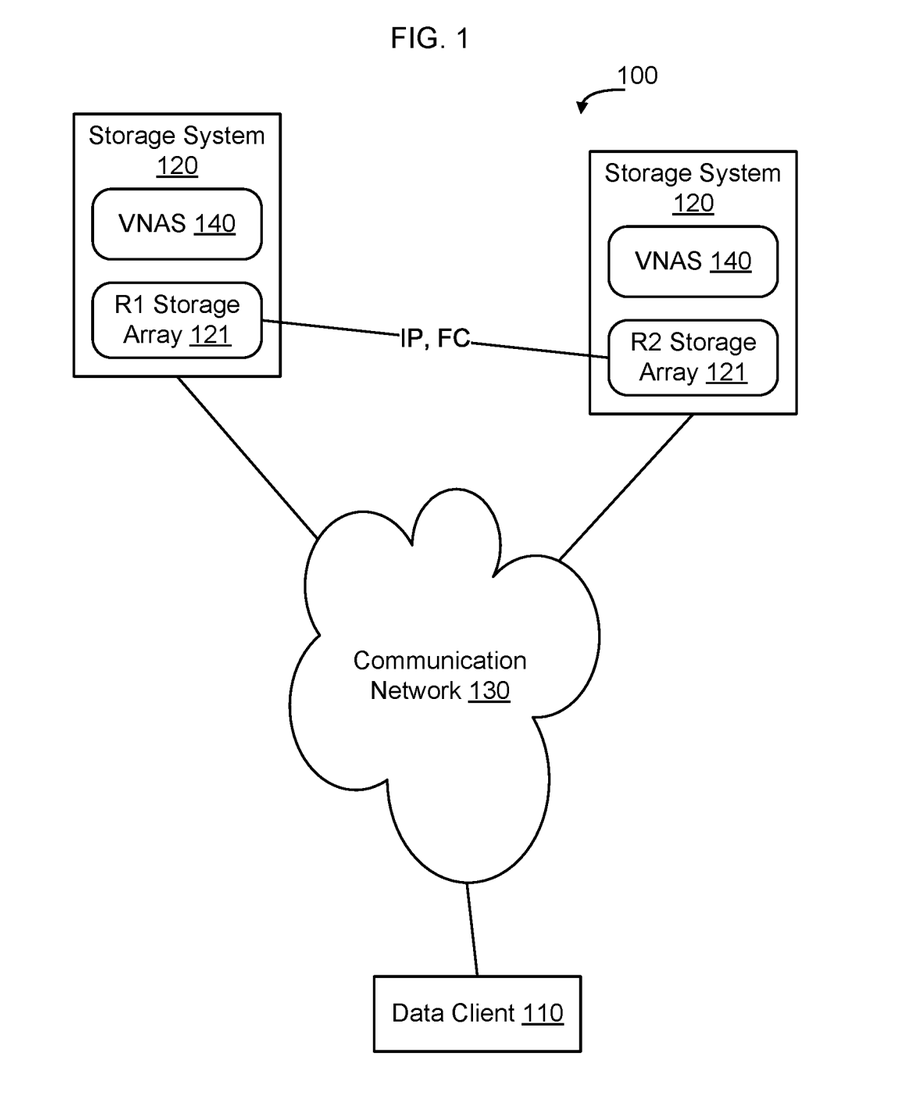
FIG. 1 is a functional block diagram of an example storage environment including software defined network attached storage systems which use synchronous data replication facilities of the underlying storage arrays for data backup, according to some embodiments of the present disclosure

FIG. 1 is a functional block diagram of an example storage environment 100. As shown in FIG. 1, in storage environment 100, a data client 110 may access storage resources provided by one or more storage systems 120 over a communication network 130. In some embodiments, the communication network 130 is an Internet Protocol (IP) communication network 130 enabling transmission of IP data packets through the communication network 130, although other forms of communication networks may be used to interconnect the data client 110 with storage systems 120 depending on the implementation.

Data from the data client 110 is stored in the storage resources of the storage systems 120. Storage resources that are accessed by a data client 110 over a communication network 130 are referred to herein as Network Attached Storage (NAS). In some embodiments, each storage system 120 has a storage array 121 of physical storage resources, which are abstracted to the data client 110 by software applications running on the storage systems 120 referred to herein as "Software Defined Network Attached Storage (SDNAS) applications." A given SDNAS application may, in some embodiments, be implemented as a Virtual Network Attached Storage (VNAS) server 140.

To provide enhanced reliability, data from data client 110 may be stored in a storage system 120 and backed upon on a second storage system 120 on the communication network 130. In some embodiments, the data client 110 interacts with a filesystem maintained by a primary VNAS server 140 on a primary storage system 120. If a failure occurs on the primary storage system 120, on communication network 130, or elsewhere, which renders the data client 110 unable to access the filesystem on the primary storage system 120, the data client 110 is able to access the filesystem on the backup VNAS server 140 on the backup storage system 120.

Two or more VNAS servers 140 that are logically associated to provide redundant access to one or more filesystems will be referred to herein as a "cluster". In some embodiments, a cluster may include multiple VNAS servers 140, and each VNAS server 140 may be responsible for hundreds of filesystems. A VNAS server 140 will also be referred to herein as a "node" in a storage cluster. As used herein, the term "data Virtual Data Mover (VDM)" will be used to refer to software that is responsible for managing access to and replication of one or more filesystems on a VNAS server 140. A given node in a storage cluster may have multiple SDNAS processes executing thereon, and each SDNAS process may have multiple data VDMs executing within it.

In some embodiments, the underlying storage arrays 121 of the storage systems 120 that are implementing a storage cluster coordinate to exchange data such that both the primary storage array R1 and backup storage array R2 have a copy of the client data.

Figure 2:
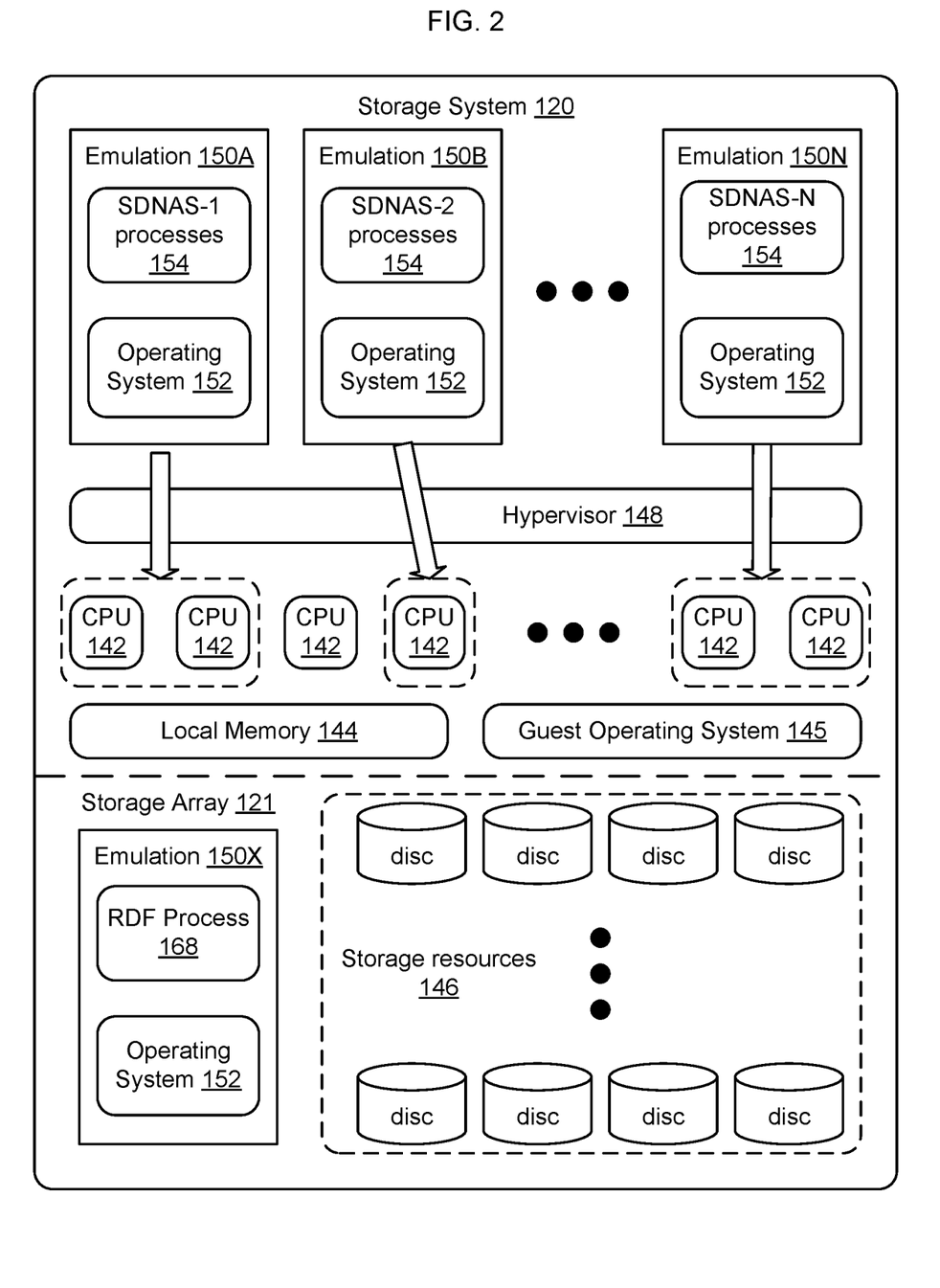
FIG. 2 is a functional block diagram of an example storage system for use in the storage environment of FIG. 1, according to some embodiments of the present disclosure.

FIG. 2 is a functional block diagram of an example storage system 120 for use in the storage environment 100 of FIG. 1. As shown in FIG. 2, the storage system 120 has physical resources including a number of CPU processor cores 142, local memory 144, a storage array 121 including storage resources 146, and other physical resources. A hypervisor 148 abstracts the physical resources of the storage system 120 from emulations 150, and allocates physical resources of storage system 120 for use by the emulations 150.

Each emulation 150 has an operating system 152 and one or more application processes running in the context of the operating system. As shown in FIG. 2, in some embodiments, one or more of the emulations 150 instantiated on storage system 120 implements one or more Virtual Network Attached Storage (VNAS) software applications 154 to enable the emulation to implement a VNAS server 140 on the communication network 130.

Figure 3:
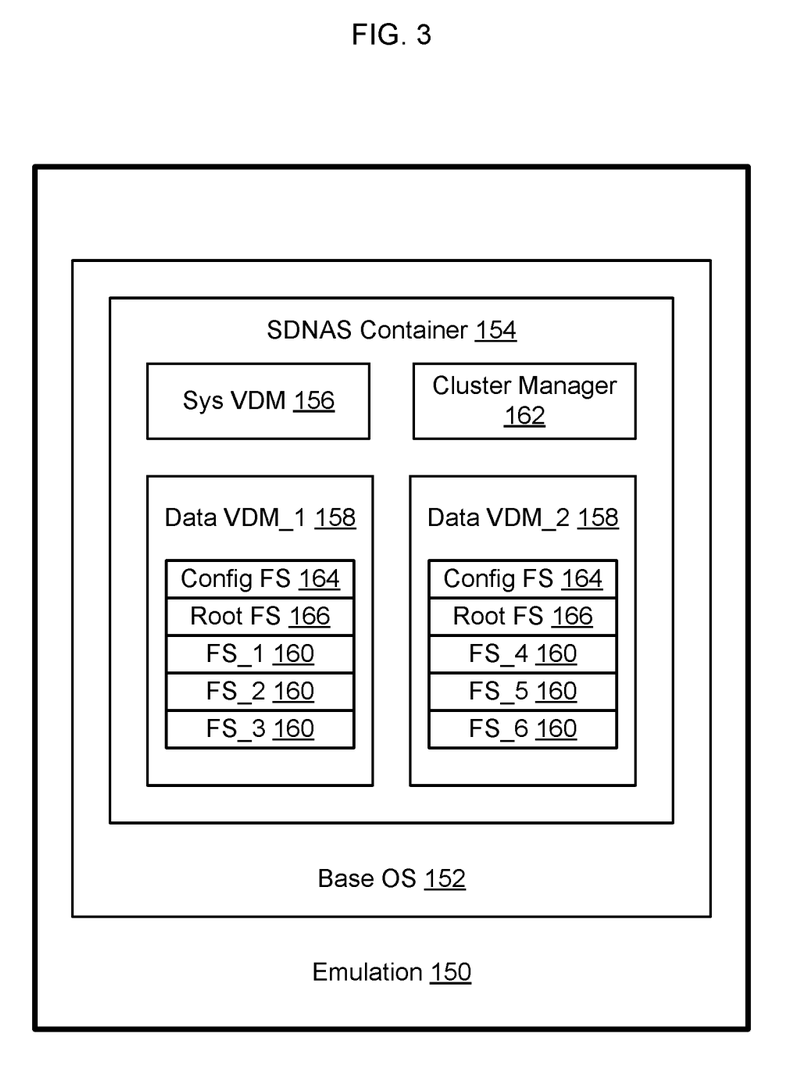
FIG. 3 is a functional block diagram of an example emulation implementing a Software Defined Networked Attached Storage (SDNAS) process of the storage system of FIG. 2, according to some embodiments of the present disclosure.

An example SDNAS application 154 is shown in greater detail in FIG. 3. As shown in FIG. 3, each SDNAS application 154 has a system Virtual Data Mover 156 and one or more data VDMs 158. Different data VDMs 158 may be associated with different data clients 110, and each data VDM 158 is responsible for one or more user filesystems 160. Each VDM 158 has a VDM root filesystem 166 and a VDM configuration filesystem 164. The VDM configuration filesystem 164 includes a SDNAS database describing how the data of the VDM root filesystem 166 and user filesystems 160 is stored in underlying storage resources 146 of the storage array 121.

A given storage system 120 may have emulations functioning as nodes in multiple storage clusters. One of the SDNAS processes in each storage cluster executes a cluster manager 162 that controls the overall structure of the storage cluster, such as defining which nodes are included in the storage cluster, which nodes and which SDNAS processes 154 executing on those nodes are to host particular data VDMs 158, which nodes should be backup nodes for particular data VDMs 158, and which user filesystems 160 should be handled by each data VDM 158.

In the example shown in FIG. 3, SDNAS container 154 includes system VDM 156. The SDNAS container 154 also includes two data VDMs 158, which are responsible for sets of user filesystems 160. For example, in the example shown in FIG. 3 data VDM-1 is responsible for user filesystems 1-3 and data VDM-2 is responsible for user filesystems 4-6.

Referring again to FIG. 2, one or more of the emulations 150 may execute applications configured to control operation of the storage array 121. For example, one application that may be executing in an emulation 150X on storage system 120 is a Remote Data Forwarding (RDF) application process 168, which causes subsets of data stored within storage resources 146 of storage array 121 to be mirrored by the storage array 121 to one or more similar backup storage arrays 121.

It is possible for a primary storage array 121 (R1) to perform data replication to a backup storage array 121 (R2) where the storage systems 120 are compatible and properly configured. The RDF application 168, when executed on storage system 120, enables the storage array 121 to participate in storage system level data replication between sets of mirroring pairs of storage systems 120. A set of storage arrays 121 that are configured for data to be mirrored from a primary storage array 121 (R1) to a backup storage array 121 (R2) will be referred to herein as a "Remote Data Facility". A given storage system, such as storage system 120, may operate as a primary storage array R1 or backup storage array R2 in many mirroring pairs, and hence multiple RDF applications 168 may simultaneously execute on storage system 120 to control participation of the storage array 121 in the mirroring operations.

Data transfer among storage systems, including transfers between storage arrays 121 for data replication (mirroring) functions, may take place in several ways depending on how the primary storage system handles data written by the data client 110 and how the backup storage system acknowledges receipt of data on the remote data facility. Two example data mirroring modes will be referred to herein as synchronous (SYNC) and asynchronous (ASYNC). Where data transfers occur between storage arrays 121, data transfer can be either over Fibre Channel or over an IP network between the two storage arrays 121. The channel used to transfer data between the storage arrays 121 (R1, R2) may not be shared by other components like the VNAS or client.

In a synchronous data replication mode, data is transmitted from the primary storage array R1 to the backup storage array R2 as the data is received from the data client 110, and an acknowledgement of a successful write is transmitted by the backup storage array R2 synchronously with the completion thereof. To maintain a synchronous relationship between the primary storage array R1 and the backup storage array R2, each IO from the data client 110 is forwarded by the primary storage array R1 to the backup storage array R2 as it is received from data client 110, and the primary storage array R1 will wait for an acknowledgment from the backup storage array R2 before issuing a subsequent IO from the data client 110.

In an asynchronous data replication mode, when data is received from the data client 110, the data is written to the primary storage array R1 and a data transfer process is initiated to write the data to the backup storage array R2 on the remote data facility. The primary storage array R1 acknowledges the write operation to the data client 110 before the primary storage array R1 has received an acknowledgement that the data has been received by the backup storage array R2. The use of asynchronous data replication enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the data client 110.

In some embodiments, the storage system 120 presents storage volumes as Thin Logical Units (TLU) 170. A TLU is a logical construct which enables the physical storage resources 146 of the storage system to be abstracted from the SDNAS applications 154. A logical unit is "thin", as that term is used herein, when actual physical resources 146 are only allocated to the TLU as needed. For example, a TLU may be presented to the SDNAS application 154 as having an available size of 1 TB (Tera-Byte). However, if the filesystem stored in the TLU is only 0.5 TB in size, the storage system will only allocate 0.5 TB of physical storage resources 146 to the TLU. Thus, the amount of physical storage resources 146 allocated to a TLU will increase and decrease over time as the amount of data stored on the TLU changes over time. Within the physical storage resources, Data Devices (TDATs) are used to store the data, in which a given TDAT may be formed of a redundant group of physical disk drives, i.e. a TDAT may be formed from a RAID group of disk drives that store blocks of data within the storage array 121.

TLUs are allocated physical storage resources 146 based on intended service level objectives for the data contained in the filesystem maintained by the TLU. Different storage resources 146 may have different IO characteristics, and storage groups 410 are created from storage resource pools of storage resources 146 to enable the storage group to meet the intended service level objective. As noted above, a given VDM may manage multiple user filesystems 160. The different user filesystems 160 may have different service level objectives and, accordingly, the user filesystem TLUs 170 may be located in different storage groups 410.

In some embodiments, the VDM root filesystem 166 is stored in a first TLU referred to herein as a root filesystem TLU, and VDM configuration filesystem 164 is stored in a second TLU referred to herein as a configuration filesystem TLU 174.

Data associated with data clients 110 is stored in user filesystem 160. A given data VDM 158 may handle multiple user filesystems 160 which may be associated with the same data client 110 or may be associated with different data clients 110. Each user filesystem 160 is stored in a separate TLU referred to herein as a user filesystem TLU 170. Metadata describing the mapping of the user filesystem TLU 170 to physical storage resources 146 is contained in the VDM configuration filesystem 164.

Synchronous RDF Reproduction

Figure 4:
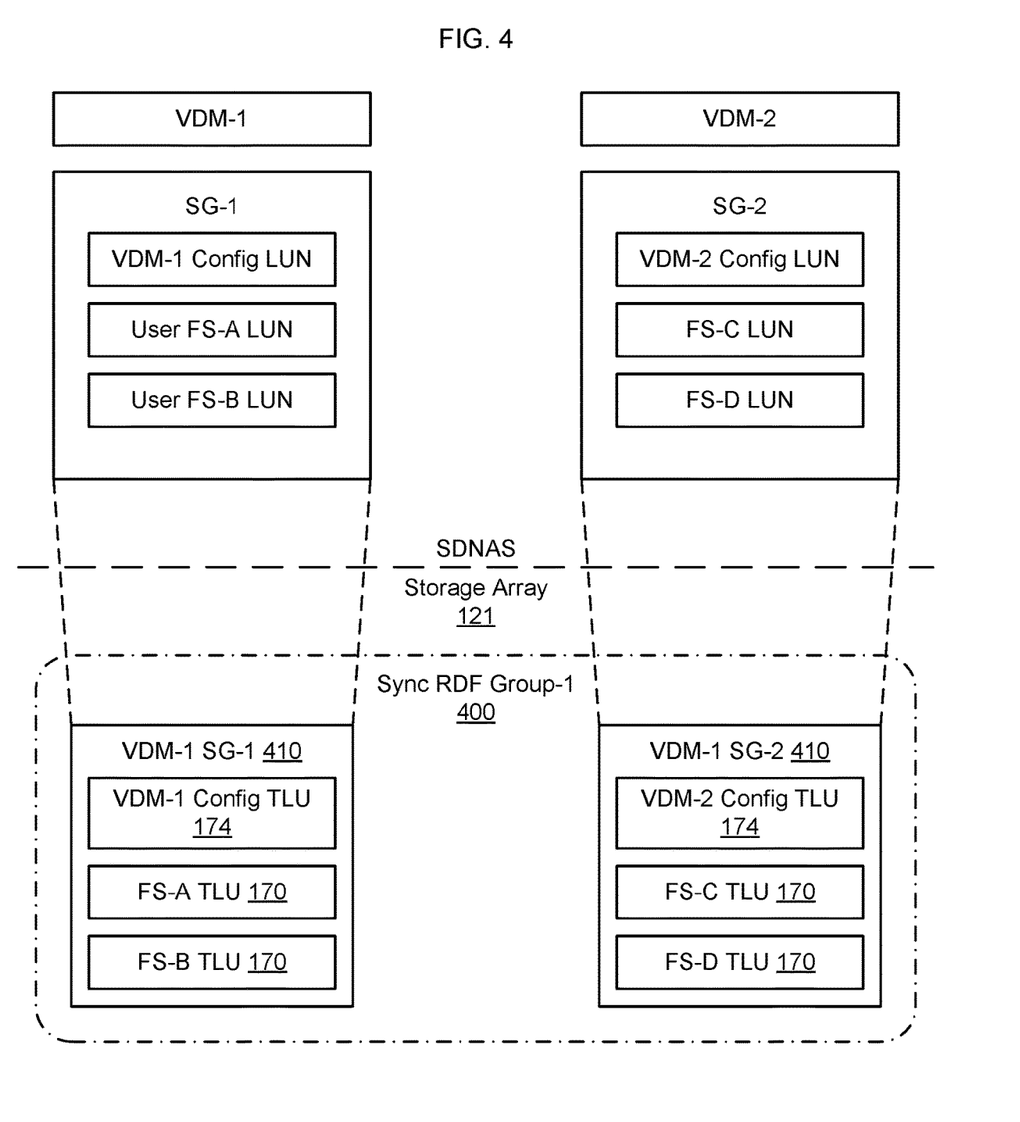
FIG. 4 is a functional block diagram of a basic architecture of software defined network attached storage systems using synchronous data replication facilities of the underlying storage arrays for data backup, according to some embodiments of the present disclosure.
Figure 5:
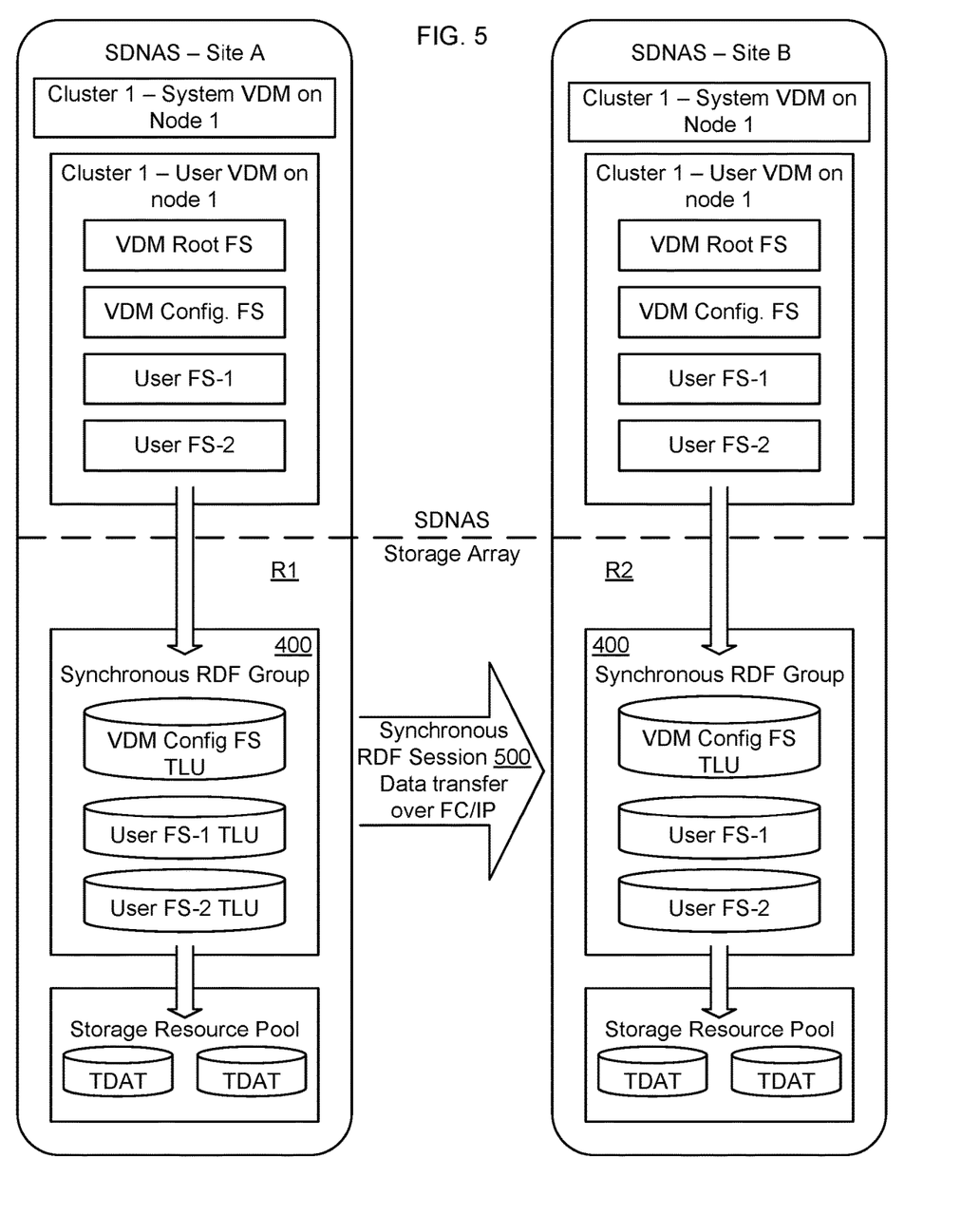
FIG. 5 is a functional block diagram of two software defined network attached storage systems using synchronous data replication facilities of the underlying storage arrays for data backup, according to some embodiments of the present disclosure.

FIG. 4 shows an example architecture for selection of data to be replicated on a synchronous RDF session 500 (see FIG. 5). In some embodiments, a synchronous RDF session 500 involves data transfer from the primary storage array R1 to the backup storage array R2 over a Fiber Channel or IP connection between the storage arrays 121. In some embodiments, the synchronous RDF session 500 replicates all data contained within a given RDF group 400, and only one RDF group 400 will be replicated on any given RDF session 500. Thus, there is a one-to-one matching between RDF group 400 on a storage array 121 (R1), and a synchronous RDF session 500 that is used to mirror data contained in the RDF group 400 to the backup storage array 121 (R2).

Each RDF group 400 may include multiple storage groups 410, each of which may include multiple TLUs 170. TLUs 170 may be added by VDMs to a storage group 410 that is part of a RDF group 400 to cause the TLUs 170 to be replicated on the synchronous RDF session 500.

FIG. 4 shows an example in which two VDMs are implemented on a given SDNAS server. Data for both VDMs is stored in storage array 121. As shown in FIG. 1, VDM-1 has storage group SG-1 that includes VDM-1 Config LUN, user filesystem A LUN, and user filesystem B LUN. The LUNs of VDM-1 are stored by Thin Logical Units (TLUs) offered by the underlying storage array 121 and are included in a first storage group VDM-1 SG-1 410. Likewise, VDM-2 has storage group SG-2 that includes VDM-2 Config LUN, user filesystem C LUN, and user filesystem D LUN. The LUNs of VDM-2 are stored by TLUs offered by the underlying storage array 121 and are included in a second storage group VDM-2 SG-2 410.

Storage Group VDM-1 SG-1 410 and storage group VDM-2 SG-2 410 are both included in a first synchronous Remote Data Forwarding (RDF) Group-1 400, which will be replicated to a backup storage array 121 (R2) in the cluster on a synchronous RDF session 500. FIG. 5 shows an example in which a synchronous RDF session 500 is used to replicate data of a SDNAS process 154 from a primary storage array R1 to a backup storage array R2.

In some embodiments the data VDM 158 configuration filesystem 164 maintains metadata relevant to accessing the user filesystem 160 contents, such as the user ID map and network configuration. When the data VDMs configuration filesystem 164 and user filesystems 160 are combined together and are replicated to the backup storage array 121 on a single synchronous RDF session 500, it becomes possible to failover the data VDM 158 to the backup site more easily and enable quicker access to data post failover. In some embodiments, by ensuring that the primary and backup sites have the same identifier (private key such as Filesystem ID and export path or share names) reserved for use at time of configuring replicating service (when setting up the synchronous RDF session on the primary storage array R1 and backup storage array R2), it is possible to ensure no disruption on the IO path access as there is no change in identifier post failover from the primary site to the backup site or vice versa. This also provides additional benefits to applications like an antivirus scanner, which are configured to scan specific paths on the primary site as well as on the backup site post failover due to disaster recovery or load balancing.

Figure 6:
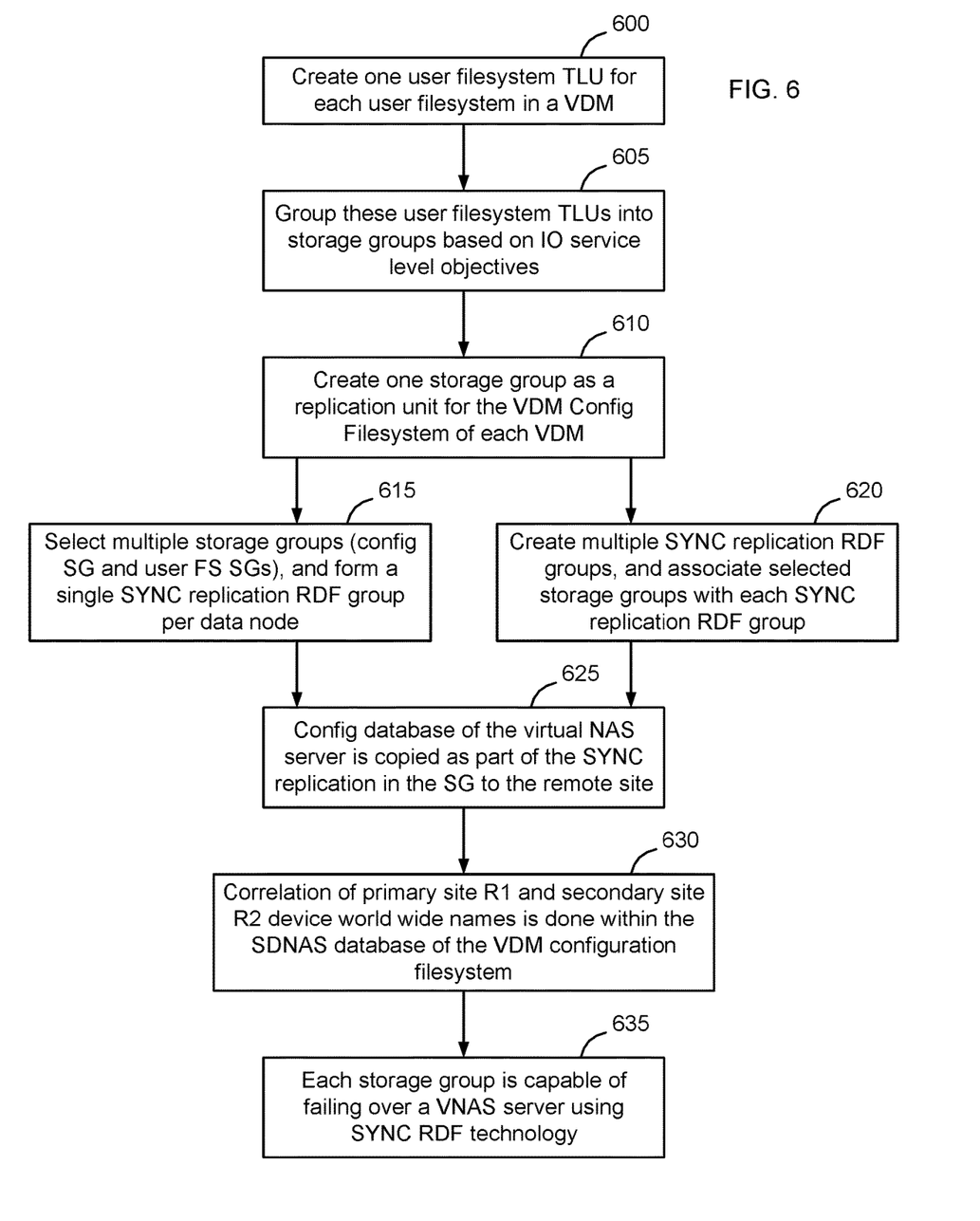
FIG. 6 is a flow chart showing an example method of software defined network attached storage systems using synchronous data replication facilities of the underlying storage arrays for data backup, according to some embodiments of the present disclosure.

FIG. 6 is a flow chart showing an example method of software defined network attached storage systems using synchronous data replication facilities of the underlying storage arrays for data backup, according to some embodiments of the present disclosure. As shown in FIG. 6, in some embodiments a TLU 170 is created for each user filesystem 160 in a data VDM 158 (block 600). The TLUs are put into storage groups based on desired service level objectives for IO processing on the TLUs (block 605). A storage group is also created as a replication unit for the VDM config filesystem TLU 174 in block 610.

Multiple storage groups are then selected and used to form a single synchronous RDF group 400 per data node (block 615). The collection of TLUs of the selected groups that are included in the synchronous RDF group 400 are part of the disaster recovery solution for the data VDM 158. Alternatively, as shown in block 620, it is possible for multiple synchronous RDF groups 400 to be used to replicate individual storage groups or sets of storage groups for the VDM. Accordingly, in some embodiments one or more than one synchronous RDF group will be created to replicate storage groups holding filesystems of the VDM. Using multiple RDF groups may be advantageous in particular scenarios. For example, it may be desirable to group filesystems with similar IO patterns into a given storage group, and then use a separate synchronous RDF group 400 and separate synchronous RDF session 500 to replicate data of the synchronous RDF group from the primary storage array R1 to the backup storage array R2.

A synchronous RDF session 500 starts replicating all TLUs of the RDF group 400 to enable all TLUs contained in the storage groups that are part of the RDF group 400 to be replicated from the primary storage array 121 (R1) to the backup storage array 121 (R2). Since the VDM config filesystem TLU 174 is included in the RDF group along with the user filesystem TLUs 170, the same synchronous RDF replication session 500 is used to transfer the VDM config filesystem 164 as well as the user filesystems 160 (block 625). By including VDM config filesystem 164, the backup storage array is guaranteed to have the required mount metadata for the replicated filesystems. On the backup, the replicated filesystem mount information is filtered and linked to the device information on the backup, to enable selected or all filesystems of a virtual NAS server (VDM) to be replicated. In some embodiments, the correlation of primary site R1 and backup site R2 world-wide names is done within the SDNAS database of the VDM configuration filesystem (block 630). Accordingly, each storage group is capable of failing over a virtual NAS server individually using synchronous RDF technology of the underlying storage arrays 121 (block 635).

Disaster Recovery—Synchronous RDF Replication

Where a synchronous RDF session is being used to replicate data of one or more storage groups, all filesystems on the primary storage array R1 and backup storage array R2 are fully synchronized at all times. Accordingly, it is possible to failover an individual VDM from the primary storage system to the backup storage system without affecting other VDMs that are sharing the synchronous RDF session. Therefore, with synchronous RDF, one or more VDMs on the synchronous RDF session may be failed over to the backup storage system 120. Specifically, each storage group is capable of failing over a virtual NAS server using synchronous RDF data replication.

Figure 7:
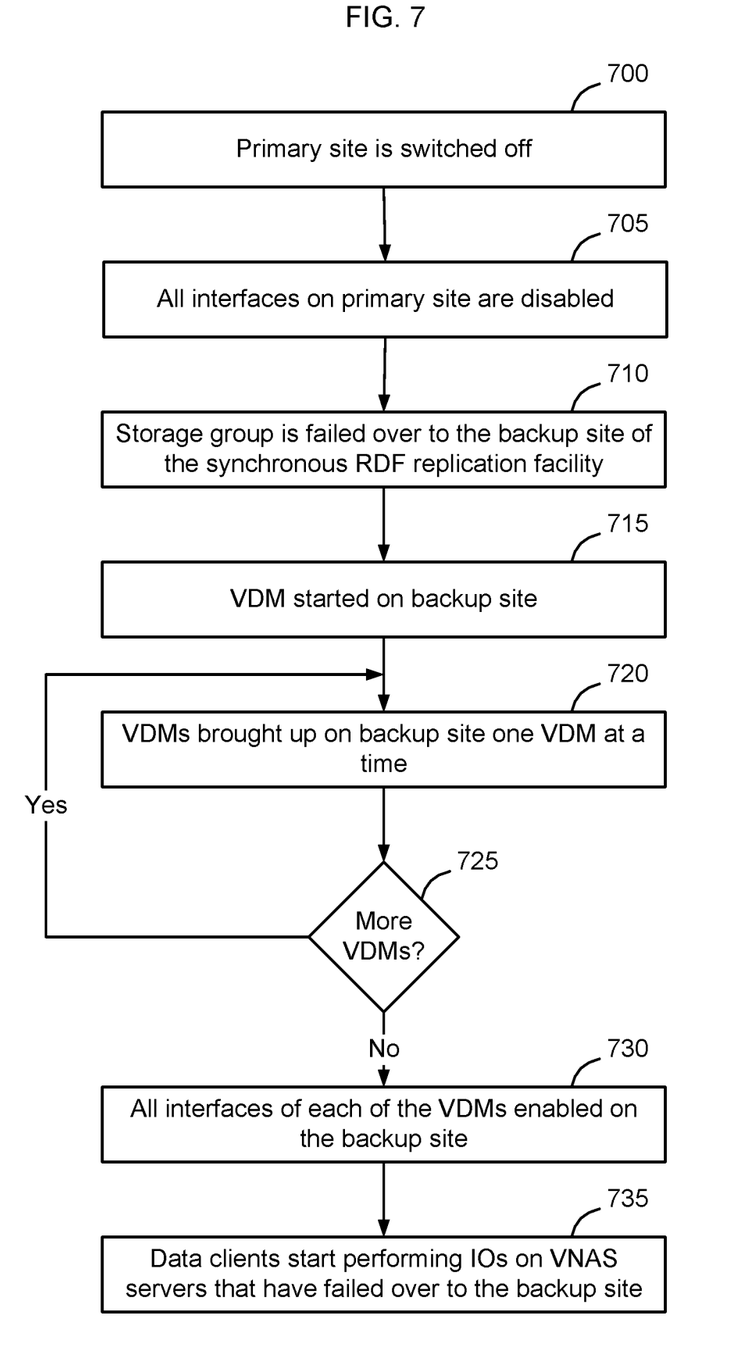
FIGS. 7-9 are flow charts showing example methods of disaster recovery of disaster recovery for Software Defined Network Attached Storage (SDNAS) using storage array synchronous data replication, according to some embodiments of the present disclosure.

To perform failover of a given storage group, as shown in FIG. 7, the primary site is switched off (block 700) and all interfaces on the primary site are disabled (block 705) so that the IOs on the primary site stop. The storage group is then failed over to the backup site of the synchronous RDF replication (block 710) and the VDM is started on the backup site (block 715).

For disaster recovery, where all VDMs are to be failed over from the primary site to the backup site, in some embodiments disaster recovery is achieved by bringing up one VDM on the backup site at a time (block 720). Each VDM is brought up on the backup site until all VDMs serving the data nodes of the entire data node and the cluster of virtual NAS servers has been brought up on the backup site (a determination of "NO" at block 725). All of the interfaces of each of the VDMs is then enabled on the backup site (block 730) so that the Network File System (NFS) and Common Internet File System (CIFS) clients (data clients 110) can start performing IOs on the VNAS servers which have failed over to the backup site (block 735). Since synchronous RDF ensures that all IOs that were acknowledged to the NFS/CIFS client are available on the backup site, all those IOs are available on the backup site and the data client 110 can simply continue to have IOs serviced by the VDMs on the backup site.

Figure 8:
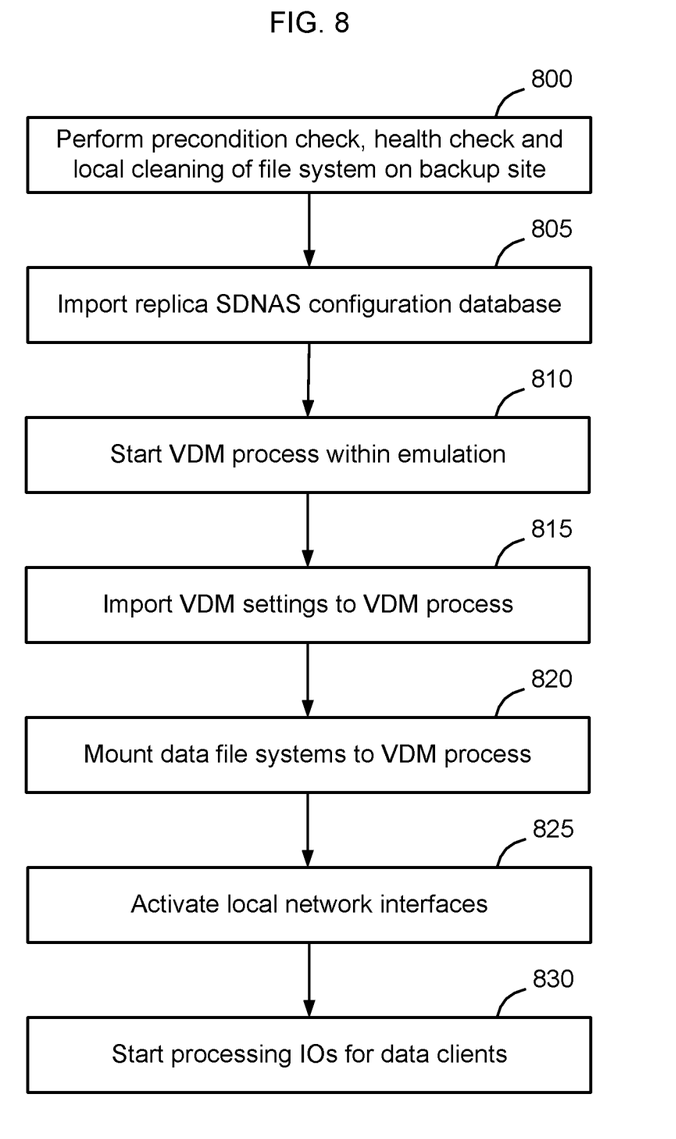

In some embodiments, as shown in FIG. 8, failover of VDM includes implementing a precondition check, health check, and locally cleaning the filesystem on the backup site (block 800) to prepare the backup system to start the VDM that is to be failed over. A replica of the network attached storage database (VDM config filesystem) is then imported (block 805) and an emulation and VDM process is started (block 810). The VDM settings are then imported to the VDM process (block 815) and the data filesystems are mounted to the VDM process (block 820). Once the data filesystems are mounted, the local network interfaces are activated (block 825) to enable the VDM to start processing IOs for the data client 110 (block 830). To provide redundancy, one or more new RDF sessions may be established for the newly started VDM process to enable the data being handled by the VDM to be replicated to another node within the cluster. Other processes such as a checkpoint (local filesystem replication process) may also be started to locally create point in time copies of the filesystems being handled by the VDM on the backup site.

Figure 9:
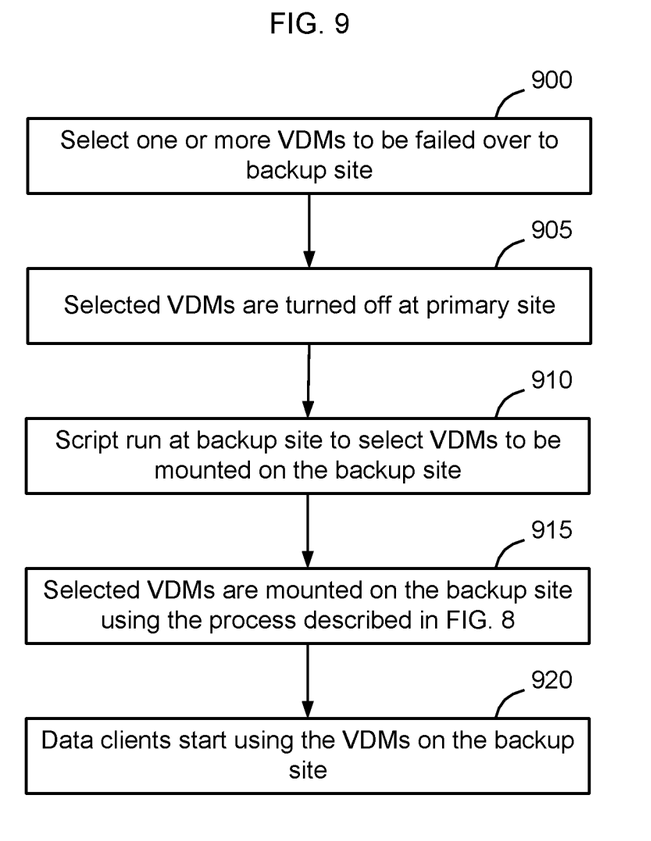

As shown in FIG. 9, when a synchronous RDF session is being used to replicate data of more than one VDM, it is possible to select one or more of the VDMs to be failed over to the backup site (block 900). This will be referred to herein as a "partial disaster recovery". For each VDM that is to be failed over, the VDM is turned off at the primary site (block 905) and one or more scripts are run on the backup site to select the VDMs to mount on the backup site (block 910). Once the VDMs are mounted on the new site (block 915), the data clients can start using the VDMs on the new site (block 920) without requiring any modification to the data client 110. For example, the IP address of the VDM on the new site will be the same as the IP addresses on the primary site prior to movement of the VDM. In some embodiments this is accomplished by having the storage system 120 on the primary site detect failure of the VDM and assigning the IP addresses by the storage system 120 on the primary site to the storage system 120 on the backup site, so that when the VDM is brought up on the backup site, the VDM on the backup site can have the same IP address that was previously used by the data client 110 to access the data at the original VDM. The IP communication network 130 will automatically redirect traffic addressed to the IP address to the new storage system so that the client can seamlessly continue receiving access to the data filesystems without requiring any reconfiguration of the data client 110.

Where a synchronous RDF session is being used to replicate data on behalf of a SDNAS server, the data that is replicated includes the VDM configuration filesystem, and all data filesystems being handled by the VDM. By including the storage layout and replicated user filesystem metadata in the same storage group as the user data TLU, it is possible to fail over the VDM from the primary storage system to the backup storage system without requiring any reconfiguration of the data client 110. Specifically, in some embodiments the VDM configuration filesystem maintains metadata relevant to accessing the user filesystem contents, such as the user ID map and network configuration. By including the VDM configuration filesystem in the same storage group as the user filesystem, and replicating this set of filesystems as a whole using a synchronous RDF session, it is possible to precisely recreate the same VDM on the backup site to enable quicker access to data after a failover process. By ensuring that the primary and backup sites have the same identifier (private key such as Filesystem ID and export path or share names) reserved for use at the time of configuring replication service, it is possible to guarantee that there is no disruption on the 10 path access as there is no change in identifier post failover from the primary site to the backup site or vice versa.

The use of a synchronous RDF replication session to replicate data to a backup storage array R2 enables a VDM to be manually moved from a primary SDNAS system to a backup SDNAS system. The failover or move leverages block level RDF synchronous replication, so it invokes zero data loss in the event of an unplanned operation. This feature consolidates VDMs, filesystems, filesystem checkpoint schedules, CIFS servers, networking, and VDM configurations into their own separate pools. The feature works for a disaster recovery where the primary is unavailable. For recovery support, in the event of an unplanned failover, an option is available to clean up the primary system and make it ready as a future destination.

While the invention is described through the above example embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing disaster recovery for Software Defined Network Attached Storage (SDNAS) using synchronous data replication facilities of the underlying storage arrays, the computer program including a set of instructions which, when executed by a computer, cause the computer to perform a method comprising the steps of:
creating a synchronous replication remote data facility between a primary storage array and a backup storage array;
instantiating a first Virtual Data Mover (VDM) executing in an emulation on a first storage system associated with the primary storage array, the VDM being responsible for managing a plurality of user filesystems stored in the primary storage array and having a VDM configuration filesystem describing a mapping between the user filesystems and locations of the user file systems in the primary storage array;
associating the VDM configuration filesystem with a first storage group;
associating a set of the user filesystems with a second storage group;
associating the first storage group and second storage group with the remote data facility;
using the synchronous replication remote data facility to mirror data of the VDM configuration filesystem and data of the set of user filesystems to the remote data facility by the primary storage array to the backup storage array;
instantiating a second VDM in a second emulation on a second storage system associated with the backup storage array;
selecting one of the set of user filesystems; and
disabling the selected one of the set of user filesystems on the first VDM on the first storage system without disabling other user filesystems of the set of user filesystems on the first VDM; and
mounting the selected one of the set of user filesystems to the second VDM on the second storage system.

2. The non-transitory tangible computer readable storage medium of claim 1, wherein the step of selecting one of the set of user filesystems comprises selecting all of the user filesystems in the second storage group.

3. The non-transitory tangible computer readable storage medium of claim 1, wherein the step of instantiating the second VDM comprises starting a VDM process within the emulation, and importing VDM settings to the VDM process from the VDM configuration filesystem.

4. The non-transitory tangible computer readable storage medium of claim 1, further comprising activating local network interfaces for the selected one of the set of user filesystems on the second VDM.

5. The non-transitory tangible computer readable storage medium of claim 4, further comprising processing 10 operations for data clients by the second VDM on the second storage system for the selected one of the set of user filesystems.

6. A non-transitory tangible computer readable storage medium having stored thereon a computer program for implementing disaster recovery for Software Defined Network Attached Storage (SDNAS) using synchronous data replication facilities of the underlying storage arrays, the computer program including a set of instructions which, when executed by a computer, cause the computer to perform a method comprising the steps of:
creating a synchronous replication remote data facility between a primary storage array and a backup storage array;
instantiating a plurality of Virtual Data Movers (VDMs) executing in emulations on a first storage system associated with the primary storage array, each VDM being responsible for managing a plurality of user filesystems stored in the primary storage array and having a respective VDM configuration filesystem describing a mapping between the user filesystems managed by that VDM and locations of those user file systems in the primary storage array;
associating sets of the user filesystems with storage groups;
associating one or more of the storage groups with the remote data facility;

associating a set of VDM configuration filesystems with the remote data facility, the set of VDM configuration filesystems including the VDM configuration filesystem of any VDM with one or more user filesystems included in the one or more of the storage groups that are associated with the synchronous replication remote data facility; and using the synchronous replication remote data facility to mirror data of the storage associated groups and VDM configuration filesystems to the backup storage array;

selectively bringing up one of the VDMs on a second storage system associated with the backup storage array.

7. The non-transitory tangible computer readable storage medium of claim 6, further comprising failing over a set of VDMs, the set of VDMs including each VDM with one or more user filesystems included in the one or more of the storage groups.

8. The non-transitory tangible computer readable storage medium of claim 7, wherein failing over the set of VDMs comprises disabling all interfaces on the primary storage system for the set of VDMs.

9. The non-transitory tangible computer readable storage medium of claim 7, wherein failing over the set of VDMs comprises starting a respective new VDM processes on the second storage system for each VDM in the set of VDMs.

10. The non-transitory tangible computer readable storage medium of claim 9, wherein starting the respective new VDM processes comprises starting each new VDM process one at a time on the second storage system.

11. The non-transitory tangible computer readable storage medium of claim 10, further comprising enabling all interface of each new VDM process.

* * * * *